# UNITED STATES PATENT OFFICE.

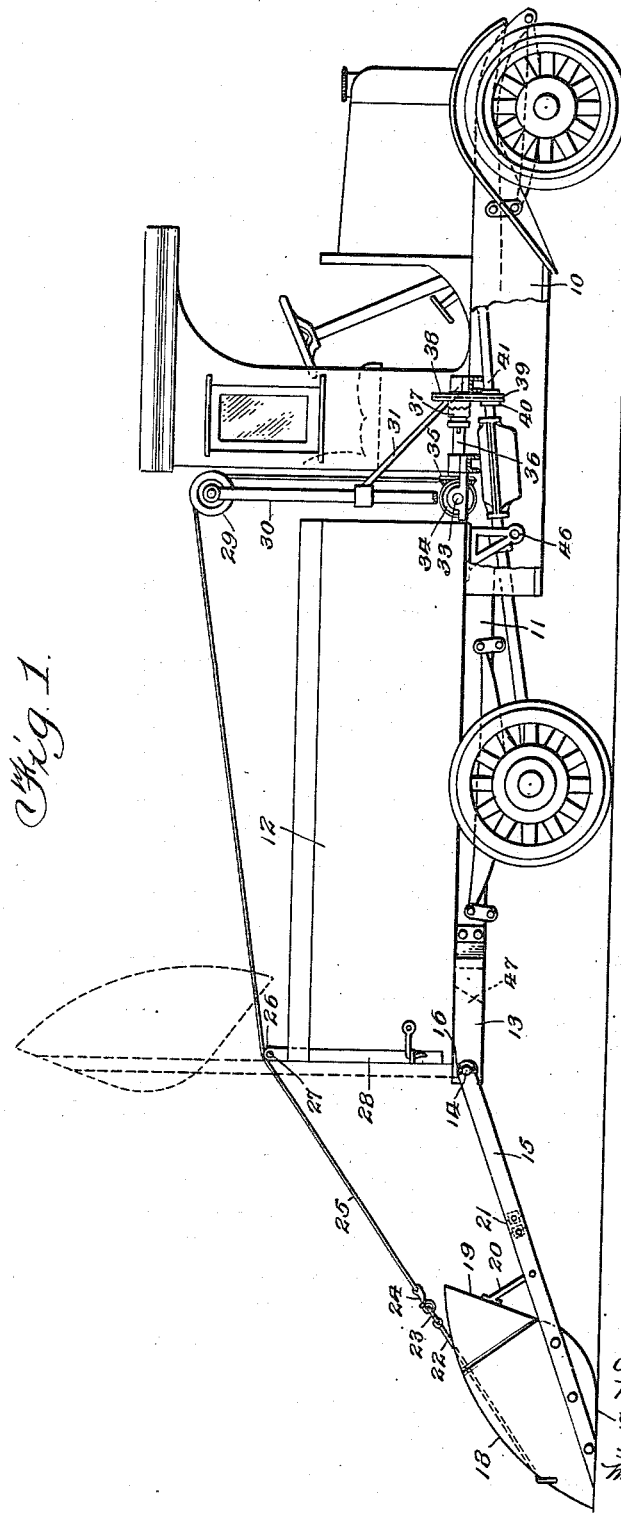

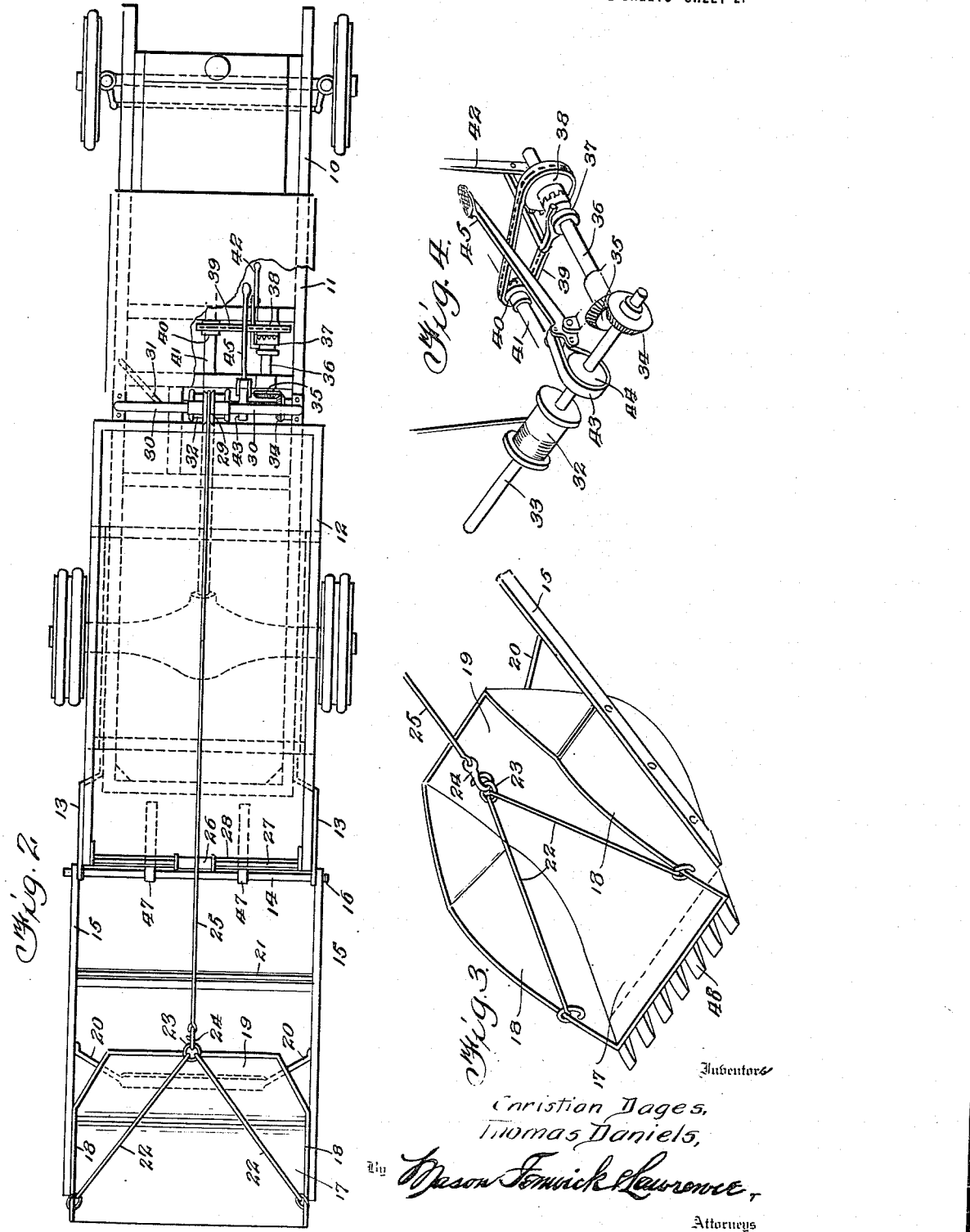

CHRISTIAN DAGES AND THOMAS DANIELS, OF NEW YORK, N. Y.

VEHICLE-LOADER.

1,285,058.

Specification of Letters Patent.  Patented Nov. 19, 1918.

Application filed October 4, 1917. Serial No. 194,743.

*To all whom it may concern:*

Be it known that we, CHRISTIAN DAGES, a citizen of the United States, residing at New York city, in the county of New York and State of New York, and THOMAS DANIELS, a citizen of the United States, residing at New York city, in the county of Kings and State of New York, have invented certain new and useful Improvements in Vehicle-Loaders; and we do hereby declare the following to be a full, clear, and exact description of the invention, such as will enable others skilled in the art to which it appertains to make and use the same.

This invention relates to vehicle loaders and more particularly for use in loading automobile trucks.

It has for an object to provide a scoop member which may be detachably carried by the vehicle, and this scoop may be loaded by the vehicle pushing it into the pile of material to be conveyed. The scoop may then be dumped by raising it above the vehicle, when the contents thereof will be deposited in the body of the vehicle.

A further object of this invention is the provision of a removable scoop which may be easily attached to, or removed from a vehicle, and having this scoop arranged to be loaded by movement of the vehicle, after which, this scoop will be raised over the body of the vehicle to deposit its load.

A further object of this invention is the provision of means for readily attaching or detaching a movable scoop to a vehicle frame.

A further object of this invention is the provision of a movable scoop detachably carried by the frame of a vehicle, and hoisting means for raising the scoop actuated by the motive power of the vehicle.

A further object of this invention is the provision of means for loading an automobile truck comprising the use of a detachable scoop which is temporarily attached to the frame of the vehicle, having said scoop so positioned as to permit its being filled by backing the vehicle to a pile of the material to be placed in the body, and then, having means carried by the vehicle for raising the scoop above the body of the vehicle so that the contents thereof may be deposited into the body of the vehicle.

Further objects will be apparent from the following specification, appended claims and drawings, in which, Figure 1 is a side elevation of an automobile truck showing the scoop applied thereto, Fig. 2 is a plan view thereof, Fig. 3 is a perspective view of the scoop detached, and, Fig. 4 is a perspective view of the hoisting means for the scoop.

The device as outlined by this invention comprises the combination of an automobile truck with a scoop detachably carried by the chassis thereof, using the motive power of the auto truck for filling the scoop, by moving the vehicle with the scoop attached thereto, and then by using the motor of the truck to raise the scoop in such a position as to deposit the load from the scoop into the body of the truck. The scoop will be detachably carried by the truck, and will have detachable connections with the hoisting means so that the scoop may be readily attached to another truck, or by detaching the scoop from the truck, it is evident that the vehicle does not have to carry the excessive load when it has no use for the same.

Referring to the drawings, 10 indicates an automobile truck comprising the chassis 11, and body 12. Brackets 13 are attached to the rear ends of the side bars of the chassis, and these brackets extend beyond the sides of the body and rearwardly where they have openings formed therein to receive the cross shaft 14. This shaft or bar supports the forward ends of the bars 15, and has temporary fastening means such as the cotter pins 16 to prevent accidental displacement of the bars 15.

The bars 15 support a scoop comprising the bottom 17, side walls 18, and rear wall 19, and the bottom and rear walls are joined as by a curved portion as shown. The rear wall may be braced as by the braces 20, and the bars 15 may be braced laterally as by the cross piece 21.

Flexible connectors 22 are secured to the side walls 18, and these connectors are fastened to a common ring 23, which receives the hook 24 carried by the hoisting cable 25. This cable passes over a roller 26 carried by the cross bar 27 usually provided for supporting the tail gate 28. This cable also passes over the sheave 29 carried by the frame 30, braced as at 31, to a winding drum 32 carried by the shaft 33, and this shaft will be journaled in bearings carried indirectly by the chassis. A bevel gear 34 is attached to the shaft 33, and this gear meshes with a similar gear 35 on the counter shaft 36, on which the clutch 37 is slidably mounted. This clutch engages a face formed on a sprocket wheel 38 so that power may be transmitted from the chain 39, and sprocket wheel 40 on the driving shaft 41 to the winding drum. The clutch member permits the operation of the shaft 33 when desired. When the drum has been actuated to raise the scoop, the clutch member may be disengaged, and then the band brake 43 may be applied to the brake wheel 44 to retard the reverse rotation of the shaft 33. The clutch member may be actuated by the lever 42, and the band brake may be controlled by the foot lever 45.

After the body has been loaded as above described, and the scoop removed, the vehicle will proceed to its destination, and then, the load may be dumped by attaching the hook 24 into the eye of the bracket 46, attached to the bottom of the body, and by winding the cable upon the drum 32, it is evident that the body of the truck will be tilted to dislodge the load by gravity.

To assist in supporting the shaft 14 when in place, brackets 47 are attached to the under side of the body. These brackets have holes therein which register with the holes in the brackets 13 to receive the shaft 14.

The cutting edge of the scoop shown at 48 will be of a type most adapted for the material being handled as for excavating, one type will be used, and for handling sand or gravel, a different form will be used.

It is evident from the foregoing that modifications may be made within the scope of the appended claims, and that no limitation is implied by the limited showing of the drawings. It is also thought that the operation of this device is clear in view of this description so no further explanation is needed.

Having thus described this invention, we claim:

1. A vehicle loader comprising in combination, a vehicle, motive power for driving said vehicle, a frame for said vehicle, brackets secured to said frame, a cross shaft carried by said brackets, bars detachably and hingedly carried by said shaft, temporary fastening means for holding said bars on said shaft, a scoop carried by said bars, said scoop comprising a bottom member, an inclined rear wall, and side walls, said inclined rear wall serving to deliver the contents of the scoop, a drum carried by said vehicle, a connection between said drum and said scoop, guiding rollers for said connection, connections for transmitting power to said drum from the motive power of said vehicle and braking means for controlling the return movement of said drum.

2. In a vehicle loader, a scoop comprising a gathering bottom and inclined rear wall, side bars extending rearwardly from said scoop having their remote ends detachably mounted upon a cross-bar, a vehicle frame having a dumping body, brackets carried by said vehicle body offset to clear said body in dumped position, a cross-shaft for said bars detachably carried by said brackets and hoisting means carried by said vehicle frame for elevating said scoop.

3. In a vehicle loader a scoop having a gathering bottom and an inclined rear wall reduced at its delivery edge, side walls for said scoop, a vehicle frame, a dumping body carried by said frame, brackets carried by said frame offset to clear said body in dumping position, a hoisting cable carried by said frame, a guiding sheave for said hoisting cable disposed above the level of the body, a cross-bar carried by said body for the tail piece of the body, a roller journaled on said cross-bar, and said sheave and roller guiding the course of the hoisting cable for the scoop in certain positions of the scoop.

In testimony whereof we affix our signatures.

CHRISTIAN DAGES.
THOMAS DANIELS.